UNITED STATES PATENT OFFICE.

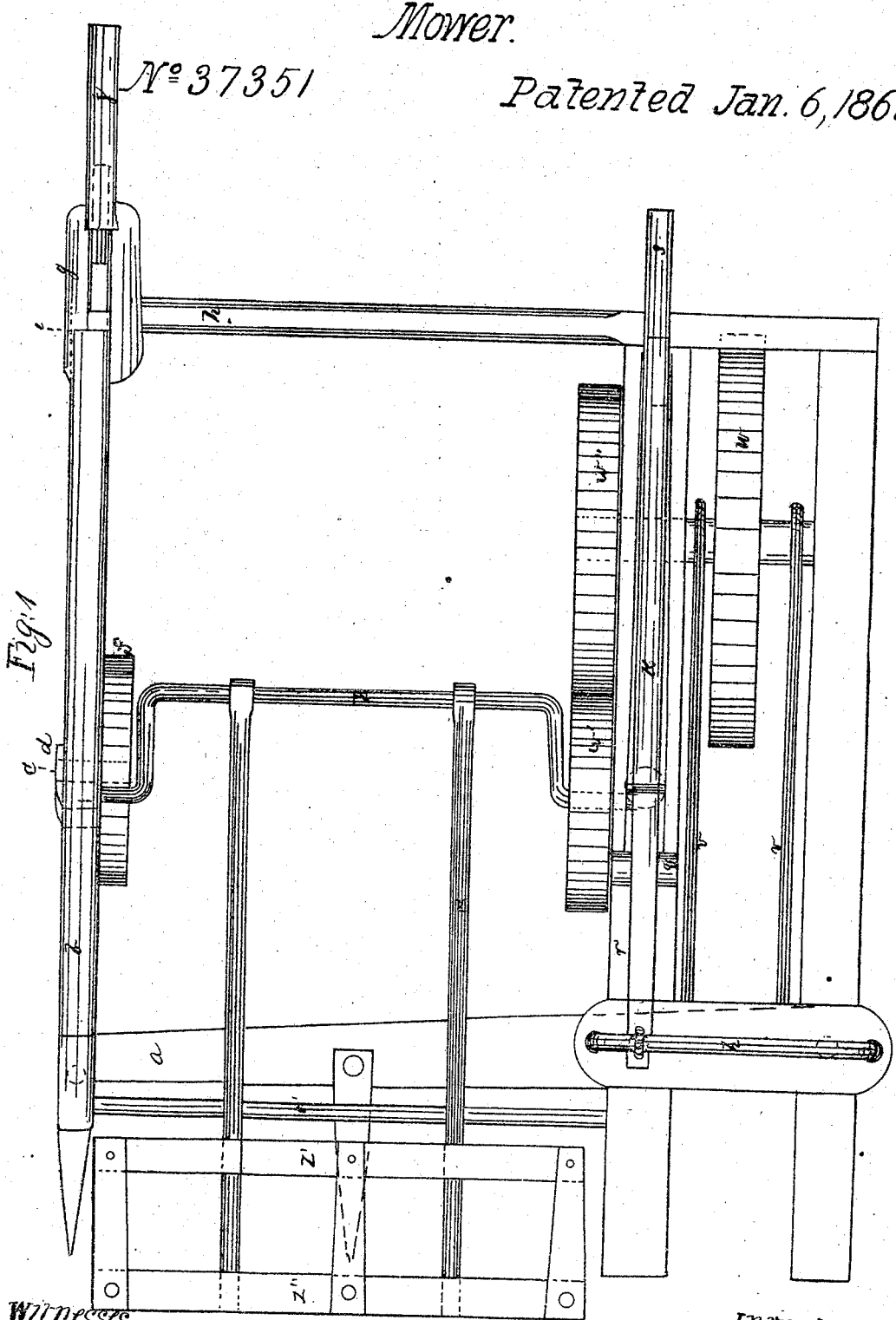

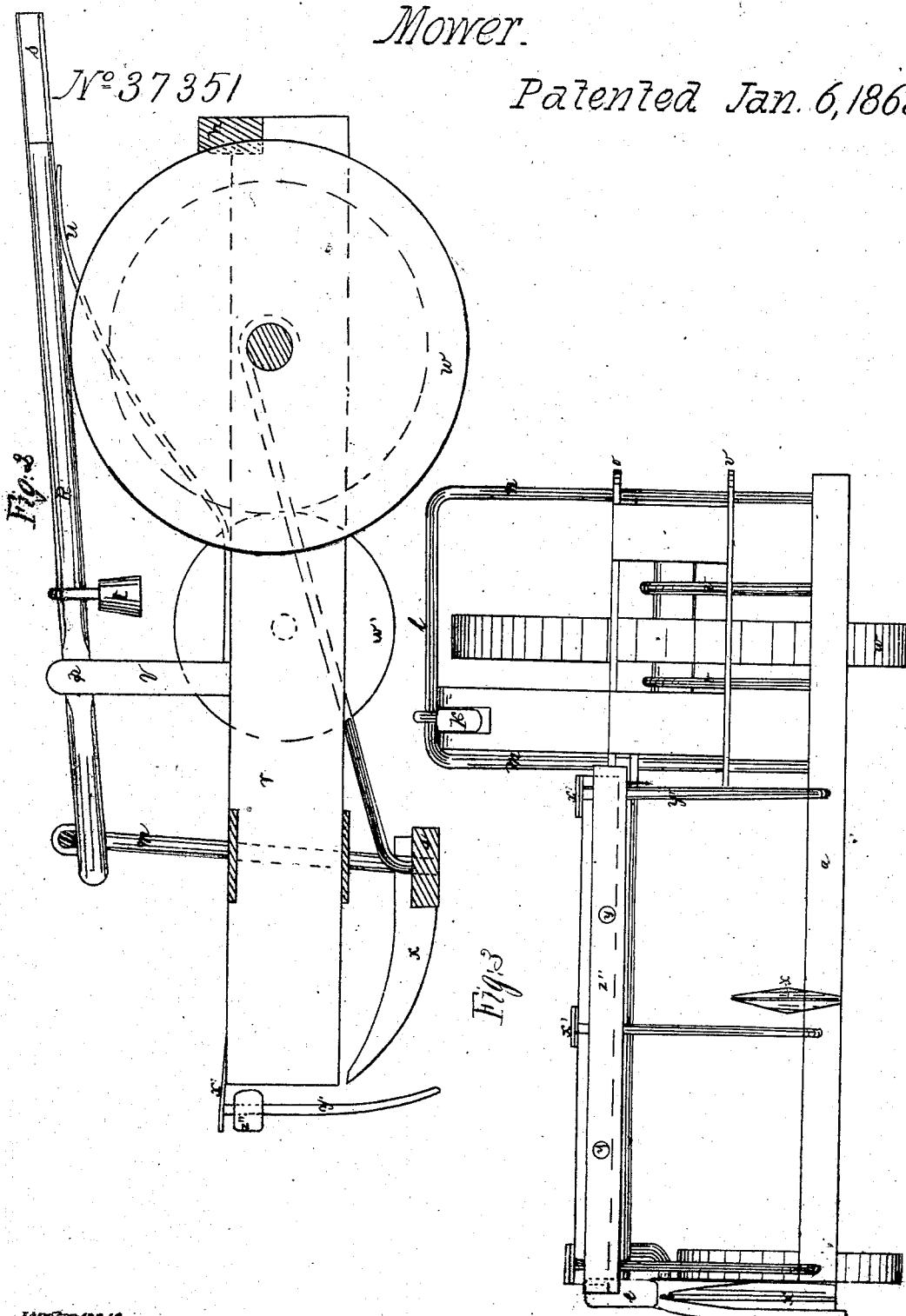

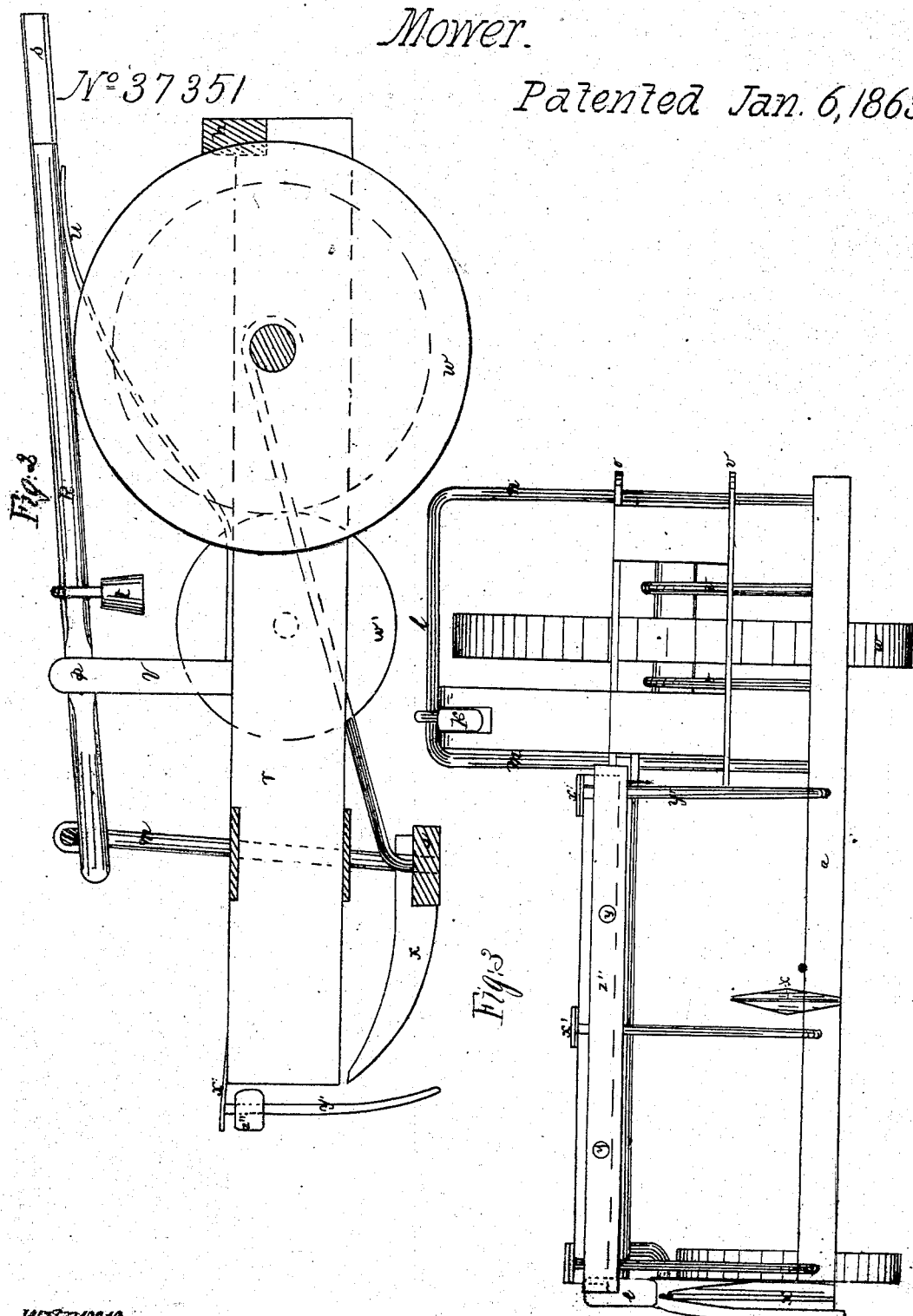

DAVID B. LUCKEY, OF BLOOMINGBURG, NEW YORK.

IMPROVEMENT IN HARVESTERS.

Specification forming part of Letters Patent No. 37,351, dated January 6, 1863.

*To all whom it may concern:*

Be it known that I, DAVID B. LUCKEY, of Bloomingburg, in the county of Sullivan and State of New York, have invented a certain new and useful Improvement on Harvesters or Mowers; and I do hereby declare the following to be a full, clear, and exact description thereof, reference being had to the accompanying drawings, and to the letters and marks thereon.

My improvement relates to certain means for relieving the cutter-bar and the frame of the cutter-bar from the injury and impediment to which it is subjected while traversing over stony or uneven ground, and also to means for the better presenting of the down grass to the cutters.

By the drawings which form part of this specification is shown so much of a mowing-machine as is necessary to give full representation of my improvement, Figure 1 being a top view thereof; Fig. 2, a side view, the outer side bar of the frame having been removed; and Fig. 3, a front view thereof.

In each of the figures, where like parts are shown, like marks and letters are used to indicate the parts.

In order to allow the cutter-bar $a$ or frame of the cutter-bar to ride over any obstacle in its track which it may meet with on stony or uneven surfaces, I suspend it in a balanced condition. By the drawings hereof this suspension is shown as effected by weighted levers and other supplemental or adjunct means; but, as is evident, the equivalents of these means may be used, as may be deemed best to adapt my improvement to the special harvester or mower upon which the improvement may be used.

On the right-hand side of the machine the one lever, $b$, is attached at its forward end to the cutter-bar, and has a fulcrum at $c$ in an arm, $d$, extending down from the side bar $e$ of the machine. This fulcrum-point $c$ is also the shaft of the riding-wheel $f$. Lever $b$ extends rearward, and passes through a slotted curved arm, $g$, from the rear cross-bar, $h$, of the machine. A shoulder, $i$, of lever $b$ has bearing against the front face of the curved arm $g$ for resisting the back-thrust of the cutter-bar, and this lever has a weight, $j$, adjustable by a screw-stem or other means in the end of the lever. On the left-hand side of the machine the other lever, $k$, is attached to the cross-head $l$ of rods or bars $m$ and $n$, that pass down through supporting-pieces $o$ $o$, and are attached to the left-hand end of the cutter-bar. Lever $k$ has its fulcrum $p$ in an upright, $q$, from the side bar $r$ of the machine, and, as is shown, extends rearward, and has an adjustable weight, $s$, at its end; or this lever and the other, $b$, may have the ordinary lever-weight, $t$. A spring, $u$, bears at one end against the lever $k$, the lower end of the spring being affixed to the side bar $r$. Lever $b$ can also have a spring, if required. Rods $v$ $v$, from around the shaft of the driving-wheel $w$, pass down to the cutter-bar and aid in resisting its back-pressure. These rods may be used more specially for this purpose whenever the rods $m$ and $n$ may be so arranged as not to give much support to the cutter-bar. The cutter-bar has projecting curved guards $x$, to facilitate its rising over the obstacles it may meet.

It will readily be seen that by the means here recited the cutter-bar may be balanced at the level desired, and that when it comes in contact with a stone or other impediment it will rise vertically, and easily and safely pass over such impediment. In rising the spring $u$ will be pulled down, and when the bar has passed over the obstacle the spring will restore the cutter-bar to its balanced condition.

In order to bring the down grass to that position which will give the cutters full action thereon, I attach to mowing-machines a lifting-rake, so operated that it shall move forward of the cutter-bar, and in its back movement draw the grass toward the cutter-bar and slightly elevate the grass. This lifting-rake, by rods $y$ $y$, is attached to a crank-shaft, $z$, the one end of which has a bearing in the frame-bar $e$ or in the arm $d$, while the other end rests in a wheel, $w'$, that derives its motion from wheel $w''$ on the main or driving wheel's shaft. The rods $y$ $y$ pass through the rear head-bar, $z'$, of the lifting-rake, and are attached to the front head-bar, $z''$, thereof. The teeth $y'$ play through the front bar, being elastic in their action by their attachment to springs $x'$, which are affixed to them at one end, while their rear points are secured to the rear bar, $z'$, of the lifting-rake. The rods $y$ move over and are supported by rod $v'$.

A lifting-rake thus attached to and operated by the mower will enable such mower to readily cut the down grass, and greatly lessen the disadvantages under which mowers have labored in cutting the down grass.

What I claim as my invention, and desire to secure by Letters Patent, is—

1. Balancing the cutter-bar and finger-bar by the weighted levers $b$ and $k$, and connecting them to the other means or devices herein set forth, so that when they come in contact with stones or other impediments they will be elevated in a vertical or nearly vertical direction, as described.

2. In combination with a mower, the lifting-rake arranged and operated in front of the cutters, substantially as set forth.

This specification signed this 7th day of November, 1862.

D. B. LUCKEY.

Witnesses:
 THOS. T. EVERETT,
 D. ROWLAND.